Dec. 12, 1933.  P. A. WERNER  1,939,476

REFRACTORY GAS BURNER

Filed Jan. 19, 1932

INVENTOR.
Peter A. Werner
BY
Harry C. Schroeder
ATTORNEYS.

Patented Dec. 12, 1933

1,939,476

UNITED STATES PATENT OFFICE 1,939,476

REFRACTORY GAS BURNER

Peter A. Werner, Oakland, Calif.

Application January 19, 1932. Serial No. 587,469

2 Claims. (Cl. 158—116)

This invention is a gas burner and has for its main object, the provision of a sanitary gas burner formed of glass having a low coefficient of expansion, whereby a smooth exterior surface is provided for easy cleaning and a smooth interior surface which provides uniform flow and mixing of the gas, assuring a uniform and odorless flame.

Gas burners made of cast iron are rough and difficult to clean, and the interior of the burner is usually very rough which does not permit uniform distribution of the gas and each burner actually operates differently from others.

The glass burner set forth in this application is smooth inside and out, burns with high efficiency and uniformity and is easily cleaned.

The invention consists primarily of any type of domestic gas burner formed of glass, porcelain, quartz or other silica compositions.

The invention is adequately illustrated in the accompanying drawing in which similar reference characters are used to indicate similar parts throughout the several views and in which.

Figure 1:
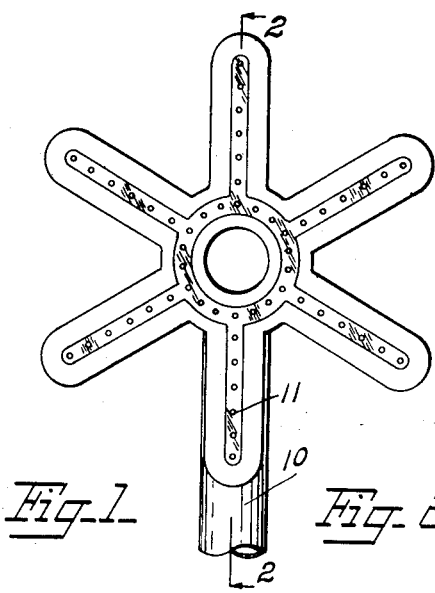
Fig. 1 is a plan view of the usual type of gas burner as applied to my invention.
Figure 2:
Fig. 2 is a section taken on line 2—2 of Fig. 1.

The invention consists of the usual gas burner Figs. 1 and 2 made of glass and having a gas inlet pipe 10 integral therewith and a plurality of apertures 11 through which the gas escapes for burning.

Figure 6:
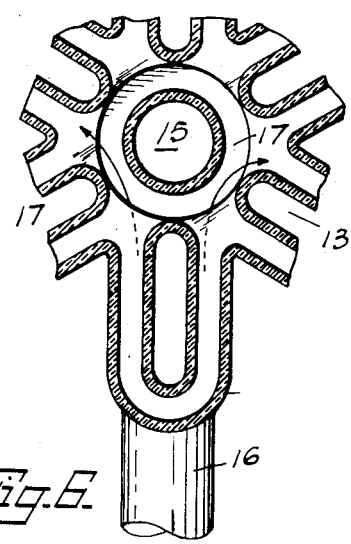
Fig. 6 is a section taken on line 6—6 of Fig. 4.
Figures 3, 5:
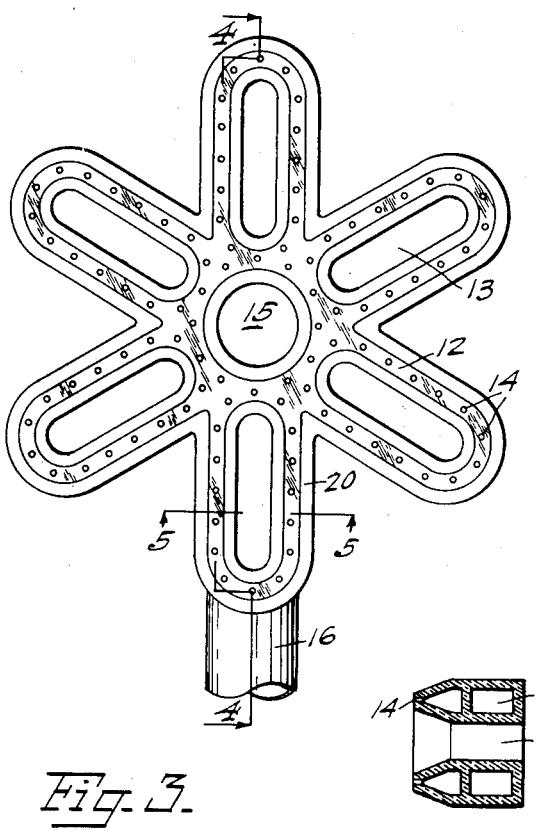
Fig. 3 is a burner especially adapted to my invention and is a plan view, thereof.
Fig. 5 is a section taken on line 5—5 of Fig. 3.

The preferred form of my invention is shown in Figs. 3 to 6 in which a plurality of fingers 12 have each a central draft aperture 13 and a plurality of burner holes 14 surrounding each draft aperture. A central draft aperture 15 is also provided, the walls of which form a baffle for incoming gas. The gas inlet pipe 16 is integral with one of the fingers 20 and is in communication with the fingers 12 and 20 through a chamber 17 formed in a hub 18 centrally of, and beneath the fingers, a wall 19 separating the finger 20 from the terminal 21 of the gas inlet pipe 16. The chamber 17 opens uniformly to all the fingers as shown in Fig. 6, providing even distribution of the gas to the various fingers.

Figure 4:
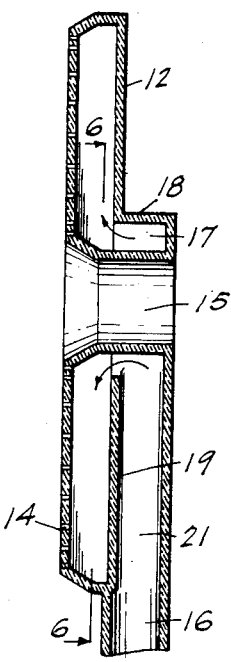
Fig. 4 is a section taken on line 4—4 of Fig. 3.

The gas flows through the gas inlet pipe 16, which may be of any standard form and through the terminal 21 into chamber 17 thence upwardly into the fingers as indicated by the arrows in Figs. 4 and 6, thence outwardly through the burner apertures 14.

The distribution being even and the inner walls of the burner being smooth, together with the draft apertures 13 provides substantially perfect combustion and a uniform flame. The glass burners are readily cleaned, being smooth and as the burners are made of glass having a low coefficient of expansion or of quartz, they will not break due to plunging by water or fluids in cooking.

Having described an operative device it will be understood that variations in construction and arrangement of parts which are consistent with the appended claims may be resorted to without detracting from the spirit or scope of the invention or sacrificing any of the advantages thereof.

I claim:

1. A gas burner comprising a body having a gas inlet pipe and a plurality of fingers, each of said fingers having a central draft aperture and a plurality of gas apertures about said draft aperture, a hub formed at the concidence of said fingers, a central aperture formed through said hub, a chamber formed about said central aperture, a hub formed at the coincidence of said ture, a hub formed at the coincidence of said ing with said chamber, said chamber communicating with said fingers to provide even distribution of gas to said fingers, said draft apertures being provided to increase the draft to the gas apertures for the purpose of promoting complete combustion of the gas.

2. A gas burner comprising a plurality of radial intercommunicating fingers connected together at their inner ends and provided each with a central draft aperture and a plurality of burner apertures formed in the top surface about the central aperture, a hub centrally disposed and projecting from the under surface of the fingers and having a gas connection communicating with a chamber formed within the hub, said chamber communicating with the fingers, a cylindrical baffle within the hub adapted to obstruct the direct flow of gas to any of the fingers.

PETER A. WERNER.